US012560461B2

(12) United States Patent
Ellis et al.

(10) Patent No.: US 12,560,461 B2
(45) Date of Patent: Feb. 24, 2026

(54) ROLLED MATERIAL END EDGE DETECTOR

(71) Applicants: John R. Ellis, Arlington, MA (US); Vitaly Tsukanov, Lviv (UA); Yura Bashtyk, Lviv (UA)

(72) Inventors: John R. Ellis, Arlington, MA (US); Vitaly Tsukanov, Lviv (UA); Yura Bashtyk, Lviv (UA)

( * ) Notice: Subject to any disclaimer, the term of this patent is extended or adjusted under 35 U.S.C. 154(b) by 280 days.

(21) Appl. No.: 18/101,477

(22) Filed: Jan. 25, 2023

(65) Prior Publication Data

US 2023/0408303 A1     Dec. 21, 2023

(51) Int. Cl.
*G01B 7/28* (2006.01)
*G01D 5/30* (2006.01)

(52) U.S. Cl.
CPC ..... *G01D 5/30* (2013.01); *G01B 7/28* (2013.01)

(58) Field of Classification Search
CPC .......... G01B 7/28; G01B 5/20; G01B 11/028; B65H 2301/4604; B65H 19/105; B65H 2551/24; B65H 2553/414; G01D 5/30
See application file for complete search history.

(56) References Cited

U.S. PATENT DOCUMENTS

| | | | |
|---|---|---|---|
| 4,195,787 A | 4/1980 | Thomason | |
| 4,553,001 A | 11/1985 | Kroetsch | |
| 4,669,300 A * | 6/1987 | Hall ....................... | G01B 3/008 33/551 |
| 5,249,754 A * | 10/1993 | Liermann ................ | G03B 1/58 242/562 |
| 5,891,298 A | 4/1999 | Kuroda | |
| 6,275,053 B1 * | 8/2001 | Morrison ............... | G01B 7/016 324/754.1 |
| 6,767,628 B1 | 7/2004 | Posa et al. | |
| 7,040,566 B1 * | 5/2006 | Rodrian ............. | A47K 10/3845 242/564.2 |
| 8,800,471 B2 | 8/2014 | King et al. | |
| 2003/0133133 A1 | 7/2003 | Fujiwara et al. | |

(Continued)

FOREIGN PATENT DOCUMENTS

| | | | | |
|---|---|---|---|---|
| JP | 2000169013 A | * | 6/2000 | .............. B41J 29/48 |
| JP | 2005060017 A | * | 3/2005 | .............. B65H 19/10 |
| KP | H07229832 A | * | 8/1995 | .............. G01B 11/30 |

*Primary Examiner* — Michelle M Iacoletti
*Assistant Examiner* — Judy Dao Tran
(74) *Attorney, Agent, or Firm* — Thomas P. O'Connell; O'Connell Law Firm

(57) ABSTRACT

An end edge detector and method for sensing and indicating an end edge along a roll of material. A sensor retained by a housing detects the end edge and triggers an output signal indicative thereof. The sensor can be formed by a light source for producing an illuminated area on the roll of material in combination with a light radiation detector. Light received by the radiation detector is processed to produce an electronic control signal, and an output signal is triggered when the light received reaches a predetermined threshold electronic control signal indicative of light scattering by the end edge. Alternatively, the sensor can comprise a probe with a tip that extends from the housing for traveling along the surface of the roll of material. Deflection of the probe by contact with the end edge trips an electrical contact switch and triggers the output signal.

11 Claims, 8 Drawing Sheets

(56)         References Cited

U.S. PATENT DOCUMENTS

| 2005/0011078 | A1* | 1/2005 | Kubota ................... | G01B 7/34 |
| | | | | 33/551 |
| 2006/0001729 | A1 | 1/2006 | Inana | |
| 2007/0259174 | A1 | 11/2007 | Albanese et al. | |
| 2009/0310126 | A1 | 12/2009 | Klock et al. | |
| 2012/0196121 | A1 | 8/2012 | Schwietz | |
| 2013/0122292 | A1 | 5/2013 | Carrdine | |
| 2014/0041572 | A1 | 2/2014 | Schuler et al. | |
| 2014/0326057 | A1* | 11/2014 | Nakayama ............ | G01B 3/002 |
| | | | | 73/105 |
| 2018/0216924 | A1* | 8/2018 | Noda ..................... | G01B 5/012 |
| 2021/0207958 | A1* | 7/2021 | Tapia .................... | G01B 11/25 |
| 2021/0262782 | A1 | 8/2021 | Schroffenegger et al. | |

* cited by examiner

ROLLED MATERIAL END EDGE DETECTOR

CROSS-REFERENCE TO RELATED APPLICATIONS

This application claims priority to U.S. Provisional Application No. 63/352,753, filed Jun. 16, 2022, the entirety of which being incorporated herein by reference.

FIELD OF THE INVENTION

The present invention relates generally to edge detection in rolled materials. More particularly, disclosed herein are sensors for detecting the end of a roll of material, such as a roll of adhesive tape, film, or another material.

BACKGROUND OF THE INVENTION

Finding the end edge of a roll of tape or film can be a challenging and frustrating task. When stuck to the underlying surface of the remainder of the roll, the torn or cut edge of thin and optically clear tapes and films of the type commonly used in consumer and business applications can be particularly difficult to recognize and locate. Indeed, with tapes intended to be clear in application, the end edge of the tape roll can quickly become effectively invisible, particularly in view of the fact that the thickness of common smooth and transparent tapes is typically in the range 15 to 40 μm. The lack of an easy method to identify the end edge of rolls of tape wastes time and regularly confounds users.

Individuals commonly attempt to identify the end edge of a roll of tape or other material visually, but successfully doing so may be difficult depending on user's vision, available ambient light, and the optical properties of the tape. Additionally or alternatively, users will often seek to employ a haptic method where the user applies his or her finger or finger nail to the roll attempting to feel the location of the end edge. Both methods are often not accurate, particularly with thin and clear tape and film.

Accordingly, the present inventors realized that there is a need for a device capable of quickly and easily identifying the end edge of a roll of rolled material and, potentially, also for assisting in the separation of the end edge to enable usage of the roll of tape, film, or other material.

SUMMARY OF THE INVENTION

In view of difficulties involved in current edge detection methods as summarized above, the present invention is founded on the basic object of providing an apparatus operative to identify the end edge of a roll of tape, film, or other rolled material quickly and effectively.

A related object of the invention is to reduce the time and frustration involved in locating the end edge of a roll of material.

In certain embodiments, a further object of the invention is to provide an apparatus that can be employed to separate the end edge of a roll of tape, film, or other rolled material from the remainder of the roll.

A further object of embodiments of the invention is to provide an apparatus that can be handheld and readily portable.

Still another object of certain embodiments of the invention is to provide a tape dispenser that incorporates such an end edge detection apparatus.

Other embodiments of the invention haven an object of providing an apparatus for detecting the end edge of a roll of material that can be employed independently of a tape dispenser.

A further object of embodiments of the invention is to provide an end edge detector that is easy to use, efficient in construction, and low in cost.

Another object of embodiments of the invention is to provide an end edge detector that provides a user with a visual, auditory, or haptic indication of the detection of the end edge of a roll of material.

These and further objects and advantages of the present invention will become obvious not only to one who reviews the present specification and drawings but also to those who have an opportunity to make use of an embodiment of the end edge detector for rolled materials disclosed herein. While the accomplishment of plural of the foregoing objects in a single embodiment of the invention may be possible and indeed preferred, not all embodiments will seek or need to accomplish each and every potential advantage and function. Nonetheless, all such embodiments should be considered within the scope of the present invention.

In accomplishing one or more of the foregoing objects, an embodiment of the end edge detector senses and indicates a location of an end edge along a surface of a roll of material by operation of a sensor retained by a housing. The sensor is operative to detect the end edge of the roll of material and to trigger an output signal indicative of the location of the end edge of the roll of rolled material. In use, the end edge detector can be applied to the surface of the roll of rolled material, and the end edge can be detected by causing the end edge detector to travel along the surface of the roll of material to reach the end edge of the roll of rolled material whereupon the sensor will detect the end edge and provide a positive output signal, such as a visual, audible, haptic, or other indication or combination of indications, of the location of the end edge.

In certain embodiments, the sensor retained by the housing comprises a light source for emitting light onto the roll of material thereby producing an illuminated area on the surface of the roll of material in combination with a light radiation detector for receiving light that has been emitted by the light source and reflected from the surface of the roll of material. An electronic computer processor and electronic memory retaining computer software are operative to process light received by the light radiation detector into an electronic control signal. The output signal is triggered in response to light received by the light radiation detector reaching a predetermined threshold electronic control signal determined to be indicative of the location of the end edge of the roll of material.

According to embodiments of the invention, one or more support and alignment formations can be retained by the housing. The housing and the at least one support and alignment formation retained by the housing establish a longitudinal direction of the end edge detector for aligning with a winding direction of the roll of material and a lateral direction of the end edge detector for aligning with a lateral direction across the roll of rolled materials. The light emitted by the light source can then be emitted in alignment with the longitudinal direction. More particularly, the at least one support and alignment formation can be operative to support the housing spaced at a predetermined distance from the surface of the roll of material and at a predetermined angular relationship relative to the surface of the roll of material. In such embodiments, the light radiation detector can be positioned within the housing to be substantially perpendicular to a radius of the roll of material. Thus, light scattered light from the surface of the roll of material will be received by the light radiation detector when the end edge detector is applied thereto. The end edge detector can further include lateral edge guides that project from the housing for maintaining the end edge detector in alignment along the roll of material.

Still further, a mirror can be retained within the housing in opposition to the light source. The mirror can be positioned to reflect light beams specularly reflected from the surface of the roll of material back to the illuminated area thereby to enhance end edge detection and to permit detection of end edges from first and second directions of approach thereto.

As disclosed herein, the end edge detector can be constructed and employed as an independent unit. In other practices, the housing can be retained by a dispenser for the roll of material, whether by being integrally formed therewith or by being removably coupled thereto.

Also according to embodiments of the invention, a scraping device can be retained by the housing, such as by being formed integrally therewith or by being affixed thereto. The scraping device has a scraping edge for initiating a peeling of the rolled material at the end edge. Thus, once the end edge is located, the scraping device of the end edge detector can be employed to initiate a separation of the end portion of the rolled material from the remainder thereof.

In other practices of the invention, the sensor retained by the housing comprises an electromechanical sensor with a probe that has a tip that extends from the housing for traveling along the surface of the roll of material. The probe thus operates as a profilometric contact probe that slides over the surface of the roll of rolled material. Under such constructions, the end edge detector can be advanced along the surface of the roll of material with the tip of the probe disposed to travel along the surface of the roll of material. When the tip of the probe contacts the end edge of the roll of material, the probe will tend to be deflected. Deflection of the probe can operate to trip an electrical contact switch retained by the housing. Tripping the electrical contact switch is exploited to trigger the output signal to indicate the location of the end edge of the roll of material. Again, the output signal could vary within the scope of the invention. In certain embodiments, the output signal comprises an electrically-operated indicator, such as a light source, a speaker, a vibrating element, or another indicator, that is actuated in response to a tripping of the electrical contact switch to produce the output signal.

Where a probe is employed as a portion of the electromechanical sensor, the probe can pivot about a pivot axis. The probe has a tip segment that retains the tip of the probe and extends from the pivot axis in a first direction and a switching segment that extends from the pivot axis in a second direction, which may or may not be opposite the first. A first electrical contact is retained within the housing to a first side of the switching segment to be contacted by the switching segment when the probe is pivoted in a first direction, and a second electrical contact is retained within the housing to a second side of the switching segment to be contacted by the switching segment when the probe is pivoted in a second direction. The probe has a neutral position in which the switching segment is disposed between the first and second electrical contacts. The electrical contact switch has an open condition when the probe is in the neutral position.

Also according to embodiments of the invention, the probe can have a resiliently flexible portion proximal to the tip. The resiliently flexible portion can operate to bias the tip into contact with the surface of the roll of material. The tip portion of the probe can be formed with a tooth that has an end facet that terminates in first and second corners that are operative to catch on the end edge of the roll of material.

In further embodiments of the end edge detector, the probe has an electrically conductive portion, and a conductive contact is disposed in proximity to the probe. A bending of the probe is operative to induce electrical contact between the electrically conductive portion of the probe and the conductive contact, and that electrical contact triggers the output signal indicative of the location of the end edge of the roll of material.

End edge detectors according to the invention can be employed to practice a method for detecting an end edge along a surface of a roll of material. Basically stated, the method can be founded on providing an end edge detector for sensing the end edge of the roll of rolled material. The end edge detector again has a housing and a sensor retained by the housing. The sensor is operative to detect the end edge of the roll of material and to trigger an output signal indicative of the location of the end edge of the roll of rolled material. With such an end edge detector provided, the detector can be applied to the roll of material and caused to travel along the surface of the roll of material to reach the end edge of the roll of material. When the end edge is reached, it can then be detected with the sensor retained by the housing.

One will appreciate that the foregoing discussion broadly outlines certain more important goals and features of the invention to enable a better understanding of the detailed description that follows and to instill a better appreciation of the inventors' contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

The present invention for an end edge detector is subject to a wide variety of embodiments, each within the scope of the invention. However, to ensure that one skilled in the art will fully understand and, in appropriate cases, be able to practice the present invention, certain preferred embodiments of the broader invention revealed herein are described below and shown in the accompanying drawings.

Figure 1:
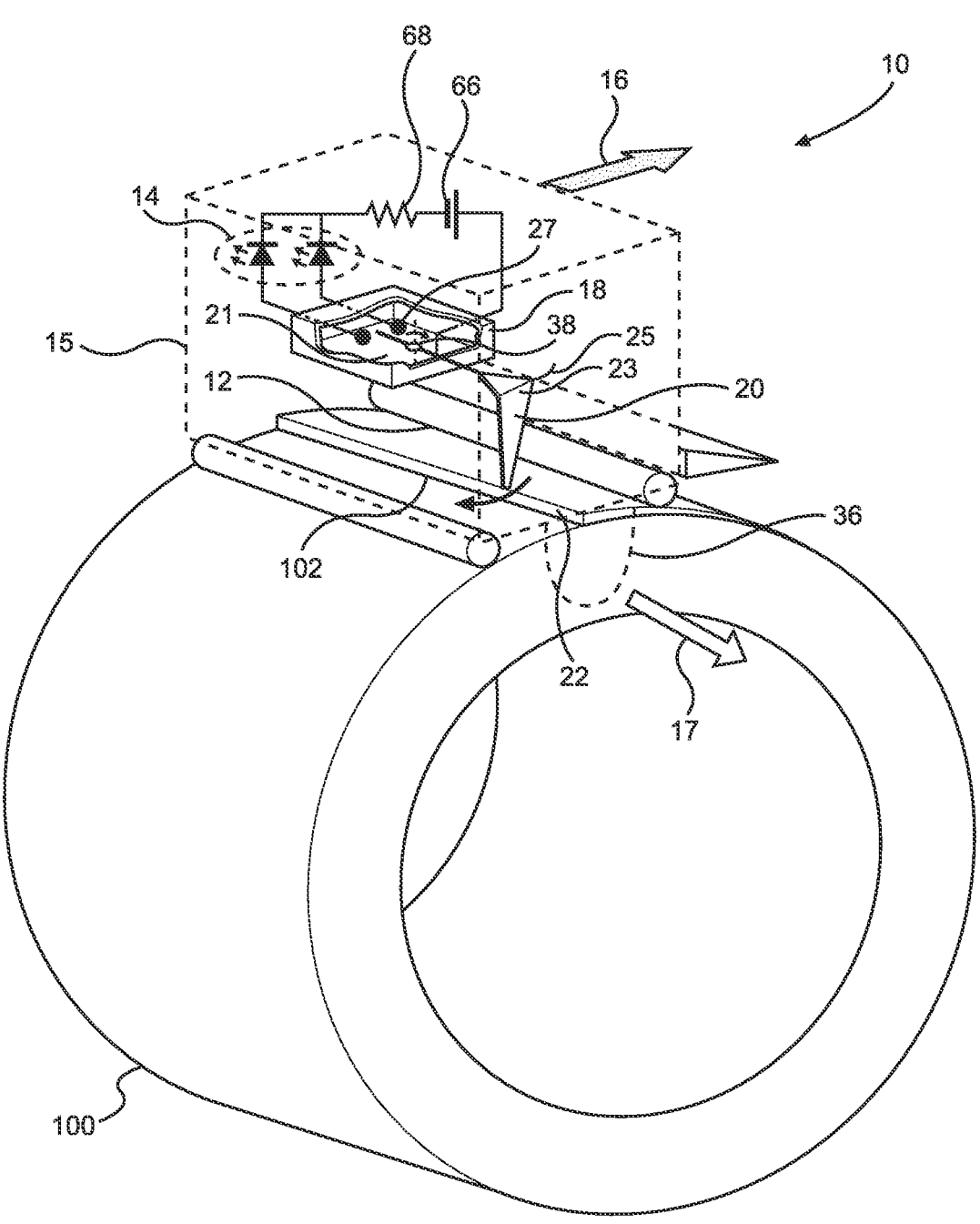
FIG. 1 is a perspective view of an electromechanical end edge detector according to the present invention.
Figure 2:
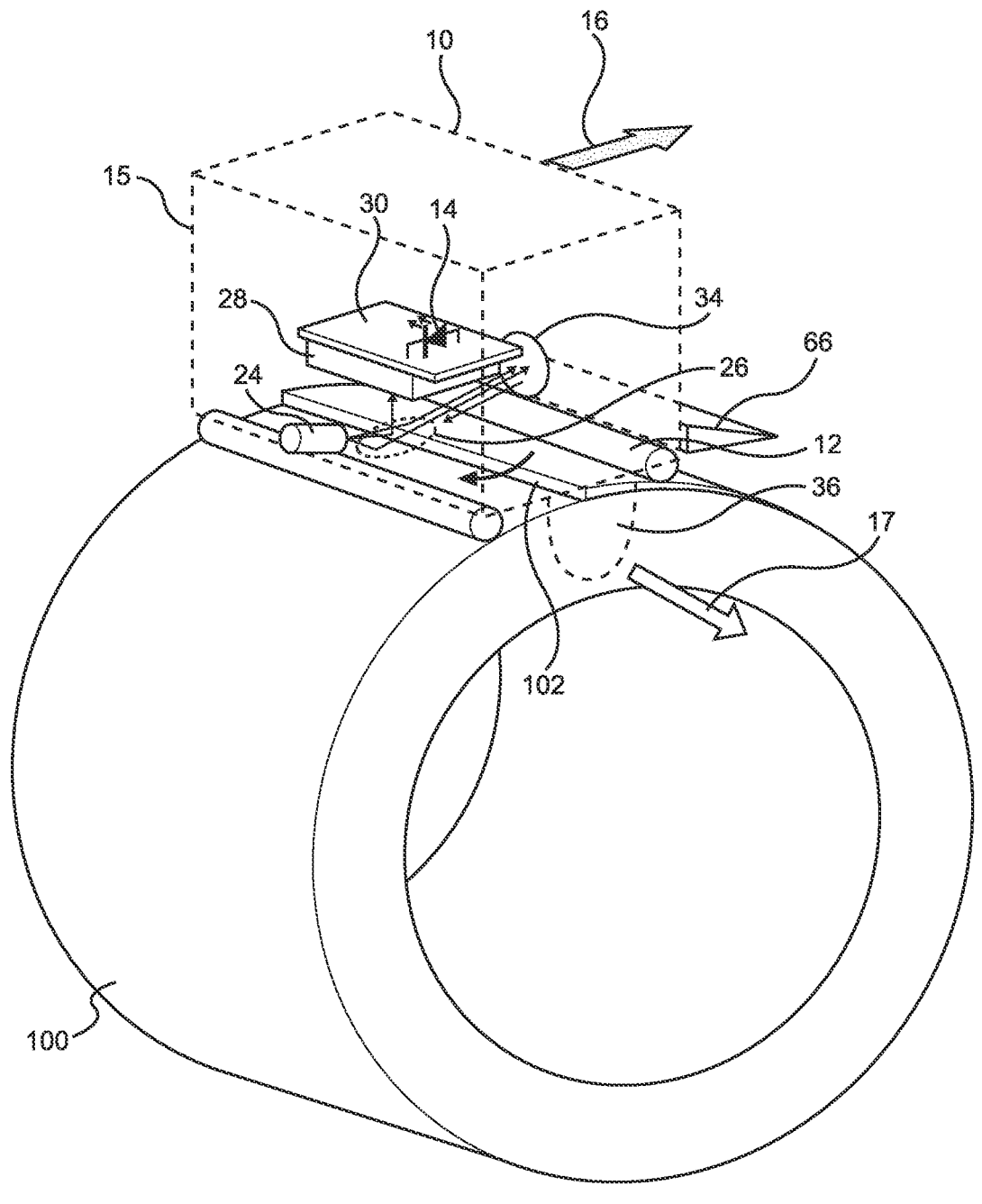
FIG. 2 is a perspective view of an optical end edge detector as disclosed herein.

Looking more particularly to the drawings, an embodiment of the end edge detector is indicated generally at 10 in FIGS. 1 and 2. In each instance, the end edge detector 10 is applied to a roll 100 of material with an end edge 102. There, the end edge 102 of the roll 100 of tape, film, or other tightly rolled material forms the dispensing end of the roll 100 and is necessarily raised by the thickness of the material in comparison to the layer wound below it.

In the embodiment of the end edge detector 10 of FIG. 1, the end edge detector 10 electromechanically recognizes the end edge 102 of the roll 100 of material, which is known to form a step on the surface of the roll 100 equal to the thickness of the tape, by operation of a profilometric contact sensor that is caused to be moved along the surface of the roll 100 of material as taught herein. In other embodiments of the end edge detector 10 as in FIGS. 2 and 6, for example, the end edge detector 10 optically detects the end edge 102 of the rolled material 100, such as by the presence or absence of scattered light propagated from the surface of the roll 100 of material and acquired by a photo detector 28 with a light acquiring aperture 58. The presence or absence of scattered light at a predetermined level is exploited by the end edge detector 10 as an indicator of the presence or absence of the end edge 102.

According to embodiments of the invention, the end edge detector 10 can be turned on manually or automatically. For instance, the end edge detector 10 can be turned on automatically by motion detection or upon a pressing of the detector 10 against a roll 100 of rolled material. Displacement of the contact sensor in the electromechanical embodiment of the end edge detector 10 of FIG. 1 can be operative through the electronic circuit board 30 and otherwise to actuate the end edge detector 10. Optical embodiments of the end edge detector 10 could be triggered, for example, detecting application of the detector 10 to a roll 100 of material.

In each embodiment, the end edge detector 10 is constructed for application to and for sliding along the surface of a roll 100 of rolled material. As such, when the end edge detector 10 is applied to a roll 100 of rolled material as, for instance, in FIGS. 1 and 2, the roll 100 of rolled material and the end edge detector 10 can each be considered to have a longitudinal direction 16, which in the case of the roll 100 of material can be considered a winding direction 16, aligned with the direction of winding of the roll 100 of rolled material and a lateral direction 17 across the roll 100 of material and perpendicular to the longitudinal or winding direction 16.

In embodiments of the end edge detector 10 that are operative optically, detection of the end edge 102 may be facilitated by the characteristics of the rolled material 100 in view of the fact that the surface of the rolled material absent the end edge 102 will generally be optically smooth, homogenous, and clear. As a result, that surface will tend to demonstrate specular reflection. Conversely, the end edge 102 will tend to scatter incident light. Therefore, pursuant to the invention, the presence or absence of scattered light can be exploited as an indicator of the presence or absence of the end edge 102.

Figure 6:
FIG. 6 is a schematic perspective view of an optical end edge detector as taught herein.

In particular embodiments of the end edge detector 10 as shown in FIG. 6, the surface of the rolled material 100, ultimately including the end edge 102, is illuminated by a light bundle 60 emitted by a light source 24 in alignment with the longitudinal or winding direction 16. The illuminating light bundle 60 can be collimated, with a slight divergence, or otherwise configured. When the illuminating light bundle 60 is emitted by the light source 24 with the end edge detector 10 positioned such that the light bundle 60 is substantially aligned with the winding direction 16, a reflected portion 62 of the light bundle 60 is specularly reflected from the smooth portion of the surface of the rolled material 100 and a scattered portion 64 of the light is scattered by the edge 102 of the rolled material 100. Thus, upwardly-reflected beams of the scattered portion 64 of the light bundle 60 are reflected upwardly while the remaining reflected portion 62 of the light bundle 60 moves past the surface of the rolled material 100 or is otherwise scattered.

Photons of the scattered portion 64 of the light bundle 60 are acquired by an optical sensor 28 having a light-acquiring aperture 58. The aperture 58 of the optical sensor 28 is disposed to receive the scattered portion 64 of the light bundle 60 radially outward of the surface of the roll 100 of rolled material. In certain embodiments of the end edge detector 10, for instance, a camera with a lens, a photodiode, a phototransistor, or a reflective optical pair, such as but not limited to a photodiode and photo receiver, are combined into a single case to operate as the optical sensor 28 of the end edge detector 10. The optical sensor 28 may thus alternatively be referred to as a photodetector or photo receiver 28. The photo receiver 28 is positioned within the housing 15 to receive photons of the scattered portion 64 of the light reflected from the surface of the roll 100 of material.

The relative amount of light received by the optical sensor 28 of the end edge detector 10 depends, for instance, on the height of the end edge 102 as determined by the thickness of the tape, film, or other rolled material 100. Based on the photoelectric response received by the optical sensor 28, embodiments of the present invention can thus measure and quickly evaluate the contrast between locations on the roll 100 to determine whether there is an edge 102 within the detected area. For instance, a larger photoelectric response received by the optical sensor 28 may be interpreted to indicate a location of an end edge 102.

Thus, in certain embodiments of the end edge detector 10, light can be emitted by an illuminating beam light source 24, and edge determination may be based on a measurement of light power in the scattered portion 64 of the light bundle 60 acquired by the photo receiver 28, such as a photodiode photo transistor or any other system for measuring light power, with a single sensitive area 58, such as a light aperture 58. Such an end edge detector 10 using a single-element photo receiver optical sensor 28 provides for an inexpensive measurement tool for edge location detection.

According to embodiments of the invention as in FIG. 2, for instance, the optical response from the photo receiver 28 is directed to an electronic analog or digital processing circuit board 30 with an electronic computer processor. The electronic circuit board 30 has electronic memory that retains computer processing software programmed to process received reflected light into an electronic control signal. The electronic memory retains a predetermined level of signal that is calculated to indicate that the edge 102 of the roll 100 of material has been located. When the predetermined level of signal is received, an output signal is triggered by the computer hardware and software to provide a positive indication of the location of the end edge 102 of the rolled material 100. The computer processor of the circuit board 30 thus makes a determination of edge location based on the illuming beams of the scattered light 64 reflected to the photo receiver 28.

The output signal can be visual, auditory, haptic, or some other signal or combination thereof. By way of example and not limitation, the output signal could be provided in the form of the illumination of one or more indicator lights as indicated at 14 in FIG. 1, an audible tone, a vibration, a visual mark applied to the rolled material 100 aligned with the located end edge 102, or any other output displaying, relaying, or presenting method or combination thereof. It is possible for different indications to be provided, such as by the illumination of one or more different light sources 14 or other differing indications, depending on the winding direction 16 the end edge 102 is detected to face. For instance, a first light source 14 could illuminate or another output signal could be provided due to triggering in a first winding direction 16, and a second light source 14 or other, different output signal could be illuminated or otherwise actuated due to triggering in a second, opposite winding direction 16.

Figure 3:
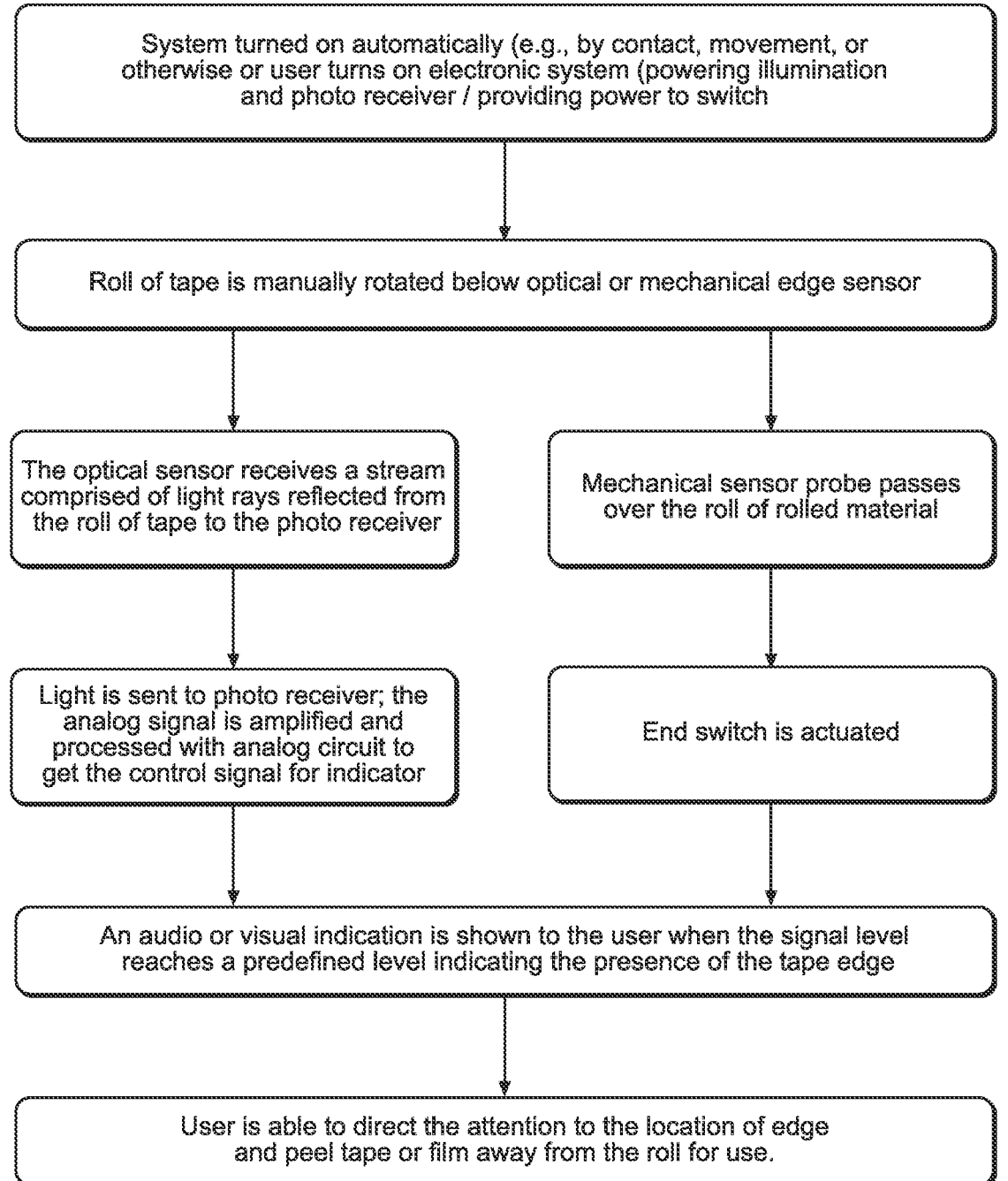
FIG. 3 is a flowchart of an end edge detection process according to the invention.

A possible method for using an end edge detector 10 as disclosed herein can be further understood with reference to FIG. 3. There, the method for edge detection can begin with a user powering on the electronics of the detector 10. In optical embodiments, illumination can then be emitted by the light source 24 and to cause any scattered light 64 to be detected by the photo receiver 28. In electromechanical embodiments, powering on of the detector 10 can cause power to be provided to the system including to an electrical contact switch 18 as shown and described herein. Then, the end edge detector 10 can be applied to a roll 100 of tape, film, or other rolled material and caused to travel over the surface of the roll 100, whether by rotating the roll 100 in the winding direction 16, advancing the detector 10 along the winding direction 16, or some combination thereof. As the detector 10 and the roll 100 are so moved relative to one another, the photo receiver 28 in optical embodiments will receive a stream of light rays of light 64 scattered from the roll 100. In electromechanical embodiments as described further hereinbelow and as shown in FIG. 1, the contact probe 20 will smoothly slide along the surface of the roll 100 of material until making contact with the end edge 102.

Accordingly, in certain practices of optical embodiments of the invention, the scattered light beams 64 produces an analog signal that is amplified and processed by use of an analog circuit 30 thereby to produce a control signal. In electromechanical embodiments as shown and described herein, the probe 20 will travel over the surface of the rolled material 100. When the edge 102 is detected, an audible, visual, or some other indication or combination thereof is provided, such as through one or more indicator lights 14 or any other audible, visual, visual and audible, haptic, or other indication. In optical embodiments, the indication may be provided when the processed signal corresponding to received scattered light beams 64 reaches a predefined level indicative of the presence of the edge 102 of the roll 100 of material. With that, the user is directed to the location of the end edge 102 of the roll 100 to permit a convenient peeling away for dispensing.

A further understanding of potential embodiments of the end edge detector 10 operative optically can be had with additional reference to FIGS. 2 and 6. As in FIG. 2, the end edge detector 10 may be considered to be founded on a housing 15. Spacer supports 12 are fixed in parallel to a lower surface of the housing 15 in spaced relation to one another. The spacer supports 12 are operative to support the housing 15 spaced at a predetermined distance from the surface of the roll 100 of material and at a predetermined angular relationship relative to the surface of the roll 100 of material. In the depicted example, the spacer supports 12 comprise rods with annular cross sections fixed to the housing 15. The spacer supports 12 can be rotatable to permit rolling over the surface of the roll 100 of material, or the spacer supports 12 can be fixed in place. It will be understood that other supports 12 are possible within the scope of the invention, including supporting formations integrated as portions of the housing 15. First and second lateral guide tabs 36 project from the sides of the housing 15 to guide the end edge detector 10 as it is advanced over the rolled material 100.

The lower surface of the housing 15 is open with an aperture therein. The light source 24 is positioned to emit light through the aperture in the housing 15 to produce an illuminated area 26 on the surface of the roll 100 of material. The light source 24 can, for example, be positioned to emit light on an optical axis approximately tangential to the surface of the roll 100. The photo receiver 28 is positioned within the housing 15, potentially disposed to be perpendicular to a radius of the roll 100 of material, to receive scattered light 64 from the surface of the roll 100 of material.

As shown, a reflecting mirror 34 within the housing 15 can form a portion of the optical path of light from the light source 24. For instance, the reflecting mirror 34 can be disposed opposite to the light source 24 with the photo receiver 28 positioned therebetween. The reflecting mirror 34 can be positioned to reflect light beams 62 specularly reflected from the roll 100 of material back to the illuminated area 26 thereby increasing the useful signal provided to the photo receiver 28. So positioned, the reflecting mirror 34 can also be operative to improve signals provided by rolls 100 of material whether they be wound in a clockwise or counterclockwise manner. The light source 24 can, for example, apply light directly to a tape edge 102 facing in a first direction aligned with the winding direction 16 while beams reflected back from the mirror 34 apply light to a tape edge 102 facing in a second, opposite direction along the winding direction 16.

A relatively narrow light beam may be scattered such that the light source 24 and the photo receiver 28 must be carefully positioned to cause scattered light 64 to meet the optical aperture 58 of the photo receiver 28. The angle between the optical axis of the light source 24 and the optical axis of the photo receiver 28 will be chosen such that that the optical response at the photo receiver 28 will be low, potentially at a minimum, when the illuminated area 26 does not include the end edge 102 of the roll 100.

According to such optical end edge detectors 10, therefore, the nature of the end edge 102 as a highly light-scattering object is exploited to provide an indication of the location of the end edge 102. The light source 24 creates an illuminating light bundle 60 with a narrow directional diagram. When the surface of the roll 100 is illuminated with the light beam bundle the specularly reflected light 62 of the incident illumination 60 tends to retains its original, narrow directional diagram. However, the scattered light 64 from the illuminating light bundle that hits the step formed by the edge 102 pursues a much wider directional diagram. Thus, spatial separation of the specularly reflected light 62 and the scattered light 64 occurs. The photo sensor 28 is positioned such that the scattered light 64 is captured by the light receiving aperture 58 of the photo sensor 28 while the specularly reflected part 62 passes by. When the area 26 on the roll 100 of material illuminated by the light source 24 does not include the end edge 102, scattered light 64 and the optical response at the photo sensor 28 thereto will be low. When the area 26 illuminated by the light source 24 does include the end edge 102, the scattered light 64 and the optical response thereto at the photo sensor 28 will become high.

A predetermined threshold of scattered light 64 received by the aperture 58 of the photo sensor 28 found to be indicative of the presence of the end edge 102 is programmed with electronic computer processing software retained in the electronic memory of the circuit board Analog and digital processing algorithms within the computer software process the received reflected light 64 into an electronic control signal, and the electronic memory of the circuit board retains a predetermined level of signal calculated to indicate the detection of the edge 102 of the roll 100 of material.

The roll 100 of material is preferably rotated relative to the end edge detector 10 along the winding direction 16, ideally with the end edge 102 facing toward the approaching end edge detector 10. The winding direction 16 may thus be alternatively referred to as the manual rotation direction 16. When the end edge 102 is detected, such as by the predetermined threshold of scattered light 64 being reached, the end edge detector 10 triggers an edge indication output signal, which can be in a visible, audible, haptic, or other form or combination thereof. In FIG. 2, the output signal comprises the electrical illumination of a tape edge indicating light emitting diode or other light source 14. Again, any other visual, audible, haptic, or other indication or combination of indications is possible within the scope of the invention. When the indication is provided, the user is thus informed that the end edge 102 of the roll 100 has been located and may be peeled away for dispensing.

In the embodiment of the end edge detector 10 of FIG. 1, the end edge 102 of the roll 100 of material is detected electromechanically. There, the end edge detector 10 is again founded on a housing 15. Spacer supports 12 are fixed to a lower surface of the housing 15 in parallel, spaced relation to one another for supporting the housing 15. The supports 12 are spaced at a predetermined distance from the surface of the roll 100 of material and at a predetermined angular relationship relative to the surface of the roll 100 of material. A mechanically-driven electrical contact switch 18 is retained within the housing 15, and the probe mechanically actuates the switch 18.

The probe 20 is pivotable about a pivot axis 38 perpendicular to the surface of the roll 100 of material. An electrically-conductive switching segment 21 of the probe 20 is operative as a common wire of the switch 18 and extends to a first side of the pivot axis 38. A tip segment or portion 23 of the probe 20 extends to a second side of the pivot axis 38. The probe 20 has a neutral position to which it could be biased in which the switching segment 21 is spaced between first and second output wires 25 and 27. The switch 18 thus has a normally open state where the common wire switching segment 21 does not contact either output wire 25 or 27 when the probe is not pivoted, rotated, or otherwise actuated. When the probe 20 is actuated, such as by pivoting, rotating, bending, or otherwise being physically moved, sufficiently in a first direction, the switch 18 is closed as the common wire switching segment 21 contacts one of the output wires 25 or 27. When the probe 20 is actuated to be physically moved sufficiently in a second direction, the common wire switching segment 21 will contact the other output wire 27 or 25 again to close the switch 18. The end edge detector 10 can thus detect the end edges 102 of clockwise-wound and counterclockwise-wound rolls 100 of material.

In the present embodiment, the tip portion 23 of the probe 20 extends through the lower surface of the housing 15 between the spacer supports 12 sufficiently to contact the surface of a roll 100 of material. When the end edge detector 10 is applied to a roll 100 of material, the tip portion 23 of the probe 20 and the end edge detector 10 in general will be positioned to travel along the surface of the roll 100 of material aligned with the winding direction 16, which again may alternatively be referred to as the manual rotation direction 16. In use, the roll 100 of material is preferably rotated relative to the end edge detector 10 in the manual rotation direction 16 such that the tip portion 23 of the probe 20 will approach toward the upstanding end edge 102 of the roll 100. The tip portion 23 of the probe 20 is constructed to be physically moved along the winding direction 16 when the tip portion 23 of the probe 20 hits the end edge 102 of the roll 100. The probe 20 will thus be deflected by the end edge 102 of the roll 100 in what may be referred to as the tape edge detection direction 22 as shown in FIG. 1, which is aligned with the winding direction 16. When the probe 20 is sufficiently deflected, the switch 18 is tripped thereby to indicate the location of the end edge 102.

When the end edge 102 has been located, a visual, audible, haptic, or other indication or combination of indications is provided. In this non-limiting example, the indication is provided in the form of one or more tape edge indicating light sources 14, such as light emitting diodes, that are electrically illuminated by the triggering of the switch 18. It is possible for different indications to be provided, such as by the illumination of one or more different light sources 14, depending on the direction of pivoting or rotation of the probe 20. Thus, a first light source 14 could illuminate due to triggering in a tape edge detection direction 22, and a second light source 14 could be illuminated due to triggering in a second, opposite tape edge detection direction 22. The end edge detector 10 can thus provide not only an indication of the location of the end edge 102 but also of a direction of winding, which may be critical to enabling a peeling of the rolled material from the roll 100. The end edge detector 10 of FIG. 1 thus uses electromechanical principles to detect the tape edge 102 using the profilometric contact probe 20 as it slides over the surface of the roll 100 while the end edge detector 10 and the roll 100 are relatively moved in alignment with the winding direction 16.

Figure 4:
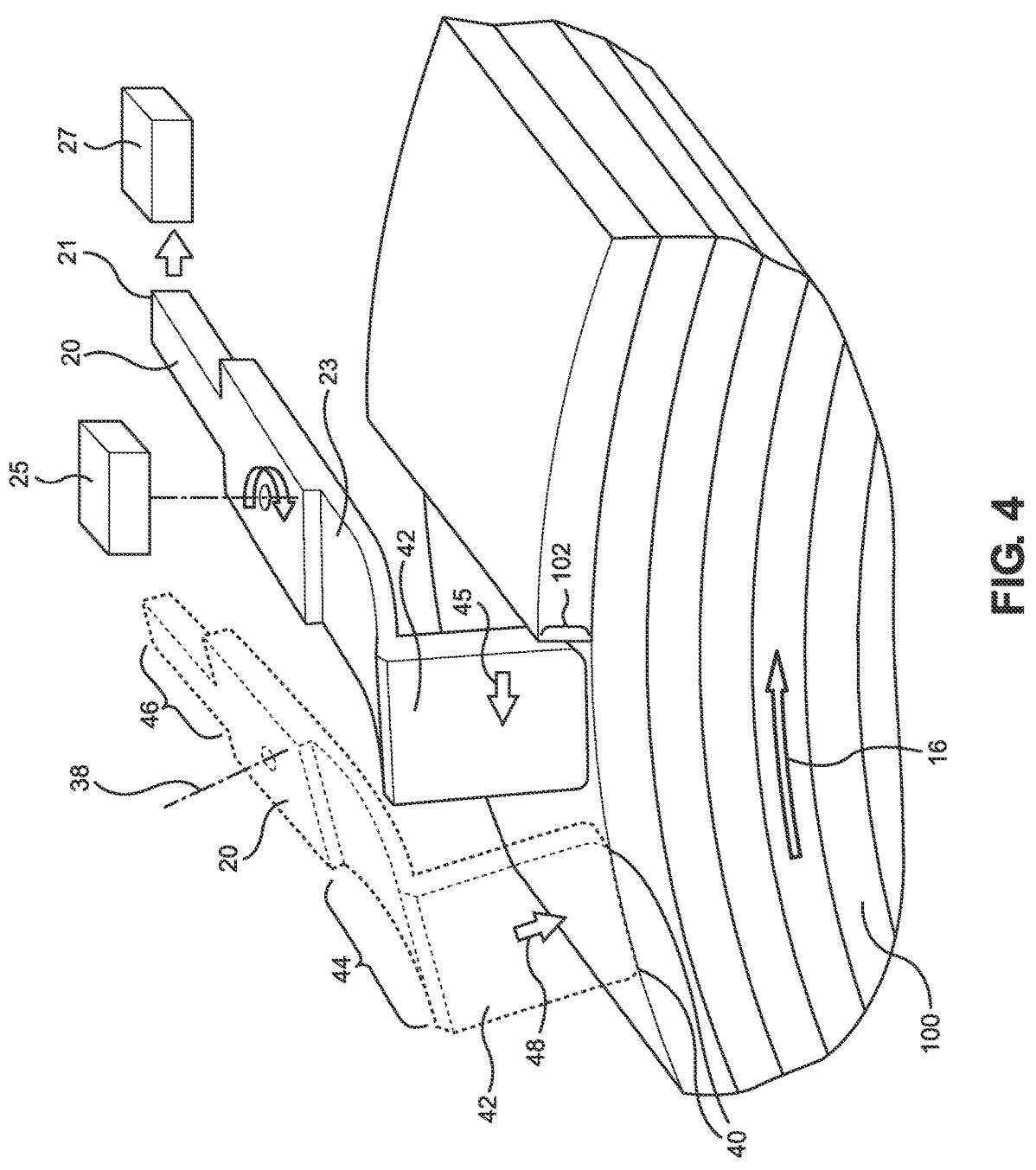
FIG. 4 is a perspective view of a probe for an electromechanical end edge detector according to the present invention shown in position spaced from an end edge of a roll of material and making contact with the end edge of the roll of material.

An alternative embodiment of the profilometric contact probe 20 can be perceived with reference to FIG. 4. There, the probe 20 is again formed as a member that is rotatable about a pivot axis 38 oriented to be generally perpendicular to the surface of the rolled material 100 when the end edge detector 10 is applied thereto. The probe 20 has a switching segment 21 that extends from the pivot axis 38 in a first direction and a tip segment 23 that extends from the pivot axis 38 in a second direction. The tip segment 23 has a distal tooth 42 and a resilient proximal portion 44 that operates as a spring. The tooth 42 is orthogonal to the proximal portion 44. The switching segment 21 of the probe 20 terminates in a switch contact lever 46.

The tooth 42 has a facet at the distal end thereof and sharp corners 40 for catching on the end edge 102 of the rolled 100 of material. The sharp corners 40 are calibrated to be sharp enough to catch on the end edge 102 of the roll 100 but not to be so sharp as to scratch the surface of the roll 100 or to hook into a smooth and bare surface. For instance, the corners 40 in certain embodiments are formed with radii of curvature less than one-half of the height of the step formed by the end edge 102. With the thickness of common smooth and transparent tapes typically in the range 30 to 40 μm, the corners 40 can thus have radii of approximately 15-20 μm. The facet formed by the distal end of the tooth 42 of the probe 20 can be polished or otherwise treated for exhibiting low friction when sliding over the surface of a roll 100 of tape or other material.

The proximal portion 44 of the tip segment 23 is flexible, much like a plate of a leaf spring. The proximal portion 44 of the tip segment 23 exhibits sufficient rigidity to maintain physical contact of the tooth 42 that it retains with the surface of the rolled material 100. By the resilience of the proximal portion 44 and the spacing provided by the end edge detector 10, such as through the housing 15 and the supports 12, the tooth 42 is biased in a biasing direction 48 into contact with the surface of the rolled material 100. Under this construction, when the end edge detector 10 is advanced over the surface of the rolled material 100 along the winding direction 16 prior to contacting the end edge 102, the tooth 42' of the probe 20' will smoothly slide therealong. When the tooth 42 of the probe 20 reaches the end edge 102, the sharp corners of the tooth 42 will catch the end edge 102 such that the end edge 102 applies a deflecting force. The deflecting force will, in turn, cause the probe 20 to pivot about the axis 38. The pivoting of the probe 20 will bring the switch contact lever 46 of the switching segment 21 of the probe 20 into contact with one of the electrical contacts 25 and 27 of the switch 18 thereby completing the electrical circuit and actuating the switch 18.

Other switching embodiments are possible and within the scope of the invention except as expressly excluded by the claims. By way of example and not limitation, whether through the probe 20 or otherwise, the end edge detector 10 could alternatively trigger a signal indicative of the location of the end edge 102 of a roll 100 of material by operation of Hall sensors, capacitive inductive and optical proximity sensors, sensors with mechanical contacts, or other sensing constructions.

Figure 5:
FIG. 5 is a perspective view of an alternative electromechanical end edge detector according to the invention.

A further embodiment of an electromechanical sensor is shown in FIG. 5. There, the sensor again incorporates a probe, which is indicated in a non-deflected condition at 20' and in a deflected condition at 20. The probe 20 comprises a flexible, conductive spring lever 14 with an L-shaped configuration. A proximal leg 43 of the L-shape is elongate and communicates in the lateral direction 42 across the roll 100 of material generally parallel to the surface thereof, and the second leg of the L-shape forms a distal tooth 42 for traveling along the surface of the roll 100 of material along the winding direction 16. When the tooth portion 42 of the probe 20 contacts the end edge 102 of the roll 100 of material, the proximal leg 43 of the probe 20 will be bent by the force 45 applied by the end edge 102. A conductive contact 47, 47' is disposed in proximity to the probe 20 such that, when the proximal leg 43 of the probe 20 is bent by the force 45 applied by the end edge 20, the electrical circuit is completed. When the electrical circuit is completed, an indication of the location of the end edge 102 can be provided as previously shown and described, such as by illumination or by haptic, audible, or some other indication or combination thereof.

So disclosed, the end edge detector 10 is operative to identify the end edge 102 of a roll 100 of tape, film, or other rolled material quickly and effectively thereby reducing the time and frustration involved in locating that end edge 102 and for peeling away a portion of the roll 100 for dispensing.

Through the visible or audible indication provided by the end edge detector 10, a user is rapidly and conveniently apprised of the location of the end edge 102 in a manner that overcomes many of the disadvantages and limitations of prior art practices.

Figure 7:
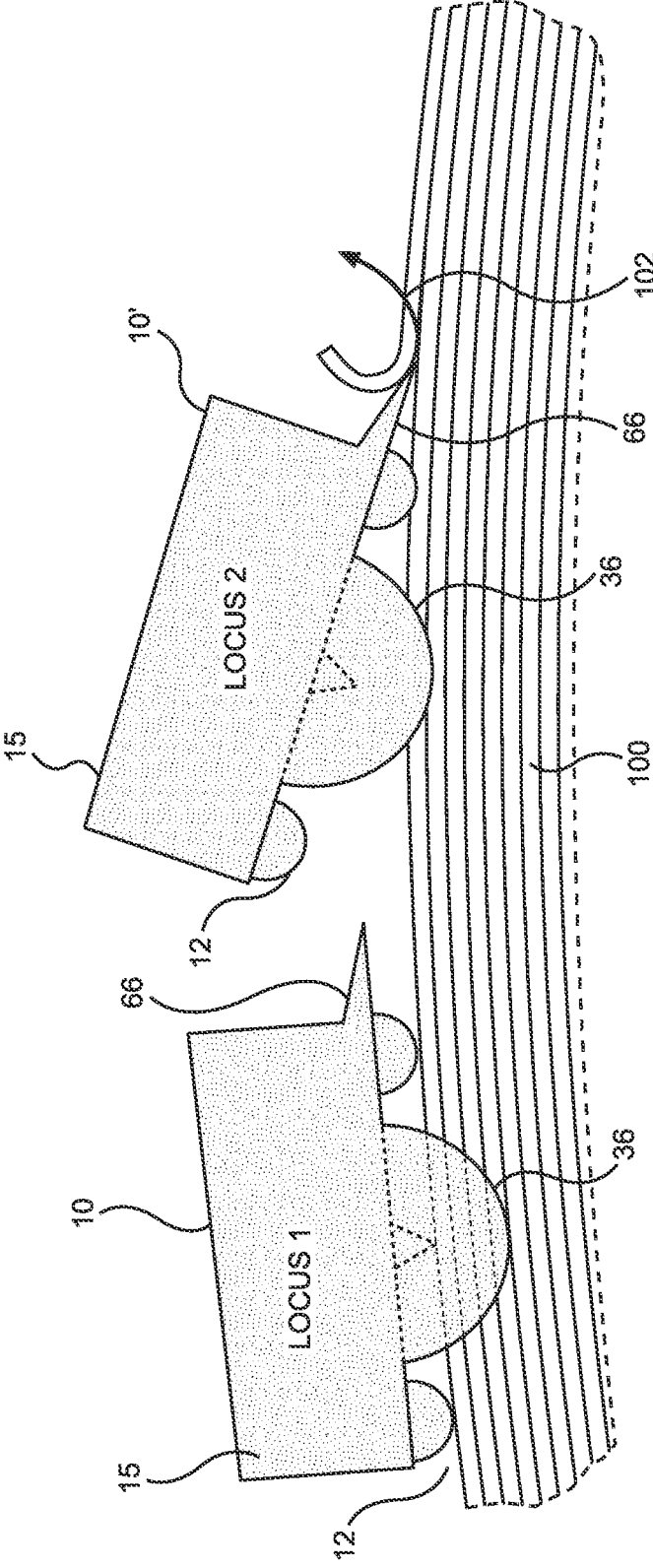
FIG. 7 is a view in side elevation of an end edge detector according to the present invention incorporating an end edge scraper.

Furthermore, in certain embodiments, the end edge detector 10 can additionally facilitate separating the end edge 102 of the roll of material, such as by use of a scraping edge retained by or incorporated into the housing 15 of the end edge detector 10. As in FIGS. 1 and 2, for instance, a scraper 66 extends longitudinally from the housing 15 to have a scraping edge disposed in parallel to the spacer supports 12. A further embodiment of an end edge detector 10 with a scraper 66 is shown in FIG. 7. There, the end edge detector is depicted at 10 and 10'. The end edge detector 10 is again founded on a housing 15 with first and second spaced spacer supports 12 and lateral edge guides 36. The scraper 66 again extends longitudinally from the housing 15 to have a scraping edge in parallel to the spacer supports 12. During normal use of the end edge detector 10, the scraper 66 is maintained in spaced relation from the surface of the roll 100 of material. When the end edge 102 has been detected, the end edge detector 10 can then be tilted as illustrated at 10', and the scraper 66 can be used to separate the end edge 102 and the end portion of the rolled material from the underlying roll 100 of material.

Figure 8:
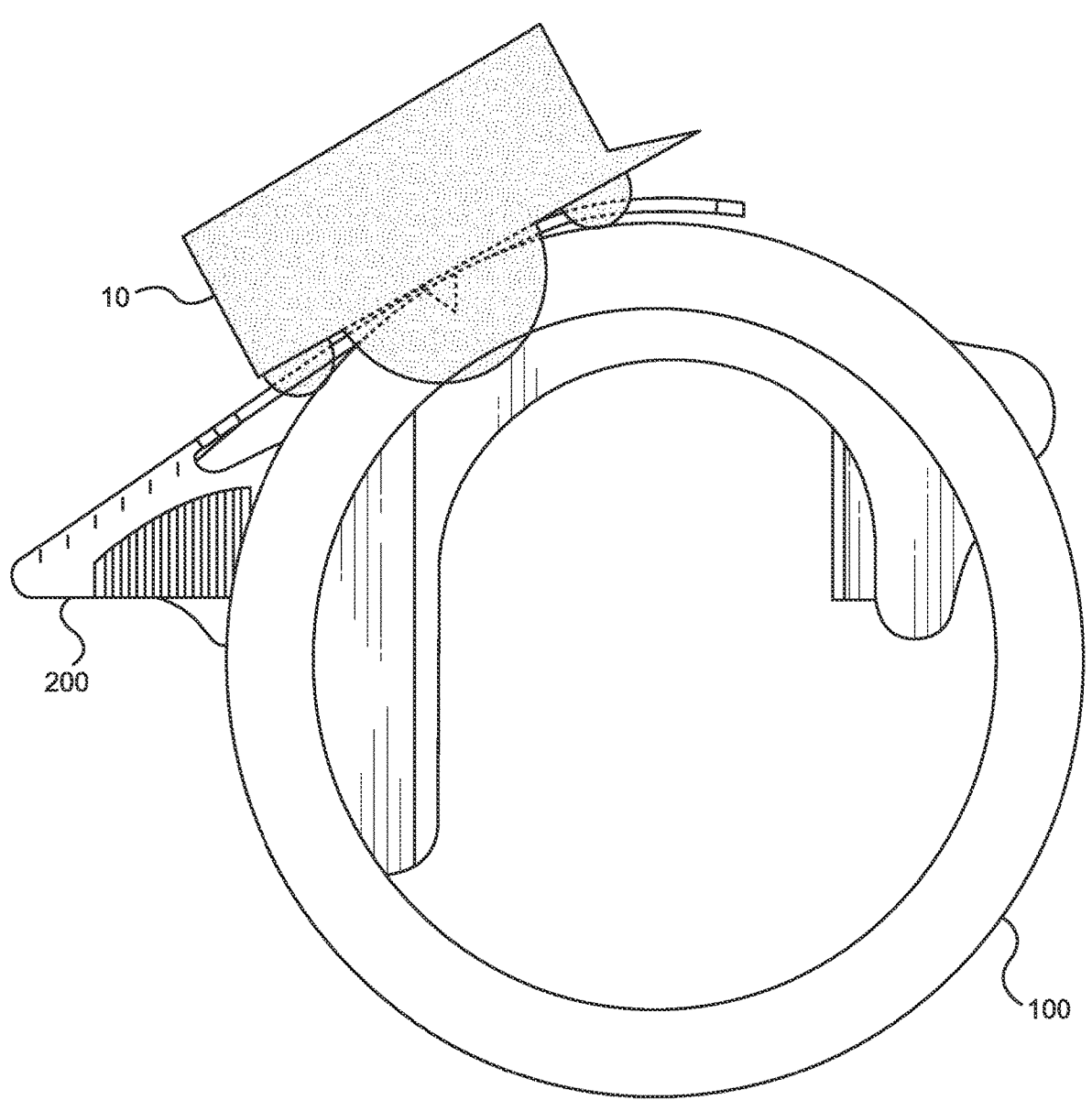
FIG. 8 is a view in side elevation of an end edge detector according to the present invention incorporated into a tape dispenser.

According to embodiments of the invention, the end edge detector 10 can be handheld and readily portable. The end edge detector 10 can be designed and used as an independent device. Also within the scope of the invention, the end edge detector 10 could be incorporated into or otherwise retained by another structure. For example, as in FIG. 8, embodiments of the end edge detector 10 could be attached to or integrated within a tape dispenser 200. In such practices of the invention, the end edge detector 10 could be integrally formed or detachable. Such manifestations should be considered to be within the scope of the invention except as may be expressly excluded by the claims.

It will be understood that terms of orientation, nomenclature, and other conventions used herein merely provide a complete understanding of the disclosed invention and are not limiting. Other conventions may be used without limitation of the teachings of the present disclosure. Furthermore, the various disclosed components are merely illustrative and are not limiting of the invention. For example, except as limited by the claims, each of the components and steps discussed herein may include subcomponents or substeps that collectively provide for the structure and function of the disclosed component or step. Still further, one or more components or steps, sometimes referred to as members or otherwise herein, could be combined as a unitary structure or a single step while still corresponding to the disclosed components or steps. Additional components and steps that provide additional functions, or enhancements to those introduced herein, may be included. For example, additional components, steps, and materials, combinations of components, steps, or materials, and perhaps the omission of components, steps, or materials may be used to create embodiments that are nonetheless within the scope of the teachings herein.

When introducing elements of the present invention or embodiments thereof, the articles "a," "an," and "the" are intended to mean that there are one or more of the elements. The terms "comprising," "including," and "having" are intended to be inclusive such that there may be additional elements other than the listed elements. As used herein, the term "example" or "exemplary" is not intended to imply a superlative example. Rather, "exemplary" refers to an embodiment that is one of many possible embodiments.

With certain details and embodiments of the present invention for an end edge detector 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the patent holder. Those claims shall be deemed to include equivalent constructions insofar as they do not depart from the spirit and scope of the invention. Certain claims may express, or be interpreted to express, certain elements as means for performing a specific function, at times without the recital of structure or material. As the law demands, any such claims shall be construed to cover not only the corresponding structure and material expressly described in this specification but also all legally-cognizable equivalents thereof.

The invention claimed is:

1. An end edge detector for sensing and indicating a location of an end edge along a surface of a roll of material with a winding direction aligned with a direction of winding of the roll of material, the end edge detector comprising:

a housing;

an electromechanical sensor retained by the housing, wherein the electromechanical sensor is operative to detect the end edge of the roll of material and to trigger an output signal indicative of the location of the end edge of the roll of rolled material;

wherein the electromechanical sensor retained by the housing comprises a probe with a tip positioned to travel along the surface of the roll of material to operate as a profilometric contact probe that slides over the surface of the roll of rolled material, wherein the tip of the probe extends from the housing, whereby the end edge detector can be advanced along the surface of the roll of material with the tip of the probe disposed to travel along the surface of the roll of material and whereby, when the tip of the probe contacts the end edge of the roll of material, the probe will tend to be deflected;

wherein a deflection of the probe is operative to trigger the output signal indicative of the location of the end edge of the roll of material;

wherein the electromechanical sensor further comprises an electrical contact switch retained by the housing wherein a deflection of the probe is operative to trip the electrical contact switch and to trigger the output signal indicative of the location of the end edge of the roll of material;

wherein the probe pivots about a pivot axis oriented to be perpendicular to the surface of the roll of material when the end edge detector is applied to the surface of the roll of material, wherein the probe has a tip segment that retains the tip of the probe and extends from the pivot axis in a first direction and a switching segment that extends from the pivot axis in a second direction opposite the first direction, and further comprising a first electrical contact retained within the housing to a first side of the switching segment to be contacted by the switching segment when the probe is pivoted in a first direction thereby to trigger the output signal indicative of the location of the end edge of the roll of material;

wherein the probe is configured so that, when the end edge detector is advanced along the winding direction of the roll of material and the tip segment of the probe hits the end edge of the roll of material, the probe will pivot in the first direction about the pivot axis oriented perpendicular to the surface of the roll of material thereby to bring the switching segment into contact with the first electrical contact to trigger the output signal indicative of the location of the end edge of the roll of material.

2. The end edge detector of claim 1, wherein the output signal comprises a visual, tactile, or audible indicator.

3. The end edge detector of claim 1, further comprising a dispenser for the roll of material wherein the housing is retained by the dispenser for the roll of material.

4. The end edge detector of claim 1, further comprising a scraping device retained by the housing wherein the scraping device has a scraping edge for initiating a peeling of the rolled material at the end edge.

5. The end edge detector of claim 1, further comprising an electrically-operated indicator that is actuated in response to a tripping of the electrical contact switch to produce the output signal indicative of the location of the end edge of the roll of material.

6. The end edge detector of claim 1, further comprising a second electrical contact retained within the housing to a second side of the switching segment to be contacted by the switching segment when the probe is pivoted in a second direction thereby to trigger the output signal indicative of the location of the end edge of the roll of material wherein the probe has a neutral position in which the switching segment is disposed between the first and second electrical contacts whereby the electrical contact switch has an open condition when the probe is in the neutral position.

7. The end edge detector of claim 1, wherein the probe has a resiliently flexible portion of the tip segment proximal to the tip wherein the resiliently flexible portion of the tip segment of the probe operates as a spring for biasing the tip into contact with the surface of the roll of material.

8. The end edge detector of claim 7, wherein the tip of the probe comprises a tooth with an end facet that terminates in first and second corners operative to catch on the end edge of the roll of material.

9. The end edge detector of claim 7, wherein the probe has an electrically conductive portion and further comprising a conductive contact disposed in proximity to the probe wherein a bending of the probe is operative to induce electrical contact between the electrically conductive portion of the probe and the conductive contact to trigger the output signal indicative of the location of the end edge of the roll of material.

10. The end edge detector of claim 1, further comprising lateral edge guides that project from the housing for maintaining the end edge detector in alignment along the roll of material.

11. The end edge detector of claim 8, wherein the first and second corners of the end facet of the tooth have radii of approximately 15-20 μm.

* * * * *